United States Patent [19]

Hung

[11] Patent Number: 5,532,917
[45] Date of Patent: Jul. 2, 1996

[54] POWER FACTOR CORRECTED RECTIFYING CIRCUIT

[75] Inventor: So W. Hung, Choi Wan Est., Hong Kong

[73] Assignee: Astec International, Ltd., Hong Kong

[21] Appl. No.: 286,798

[22] Filed: Aug. 5, 1994

Related U.S. Application Data

[63] Continuation of Ser. No. 18,874, Feb. 17, 1993, abandoned.

[51] Int. Cl.$^6$ .............................. H02M 7/08; G05F 1/70
[52] U.S. Cl. ................ 363/67; 363/69; 323/208
[58] Field of Search ........................... 323/208; 363/67, 363/69, 44–48

[56] References Cited

U.S. PATENT DOCUMENTS

| | | | |
|---|---|---|---|
| 2,817,055 | 12/1957 | Taubenslag et al. | 363/69 |
| 4,677,366 | 6/1987 | Wilkinson et al. | 323/222 |
| 4,683,529 | 7/1987 | Bucher, II | 363/44 |
| 4,855,890 | 8/1989 | Kammiller | 363/44 |
| 5,001,620 | 3/1991 | Smith | 363/89 |
| 5,047,912 | 9/1991 | Pelly | 363/89 |
| 5,088,019 | 2/1992 | Williams et al. | 363/69 |
| 5,134,556 | 7/1992 | Courier de Mere | 363/37 |
| 5,267,137 | 11/1993 | Goebel | 363/87 |

FOREIGN PATENT DOCUMENTS

WO90/09087 8/1990 WIPO.

OTHER PUBLICATIONS

James J. Spangler, Motorola Semiconductor Products, Inc., Schaumburg, Illinois, "A Power Factor Corrected, MOSFET, Multiple Output, Flyback Switching Supply" 18 pages May 1994.

Primary Examiner—Peter S. Wong
Assistant Examiner—Adolf Berhane
Attorney, Agent, or Firm—Coudert Brothers

[57] ABSTRACT

A power factor corrected rectifying circuit is disclosed. The invention may be implemented using only passive elements and, in such an embodiment, achieves a power factor of about 80%. The invention comprises two rectifying circuits for providing two rectified current paths from an AC input port to an output port. The coupling of current along one of the rectified current paths is delayed. As the sum of the delayed and undelayed currents, the input current pulse is widened to approximate a sinusoid, thereby increasing the power factor.

18 Claims, 9 Drawing Sheets

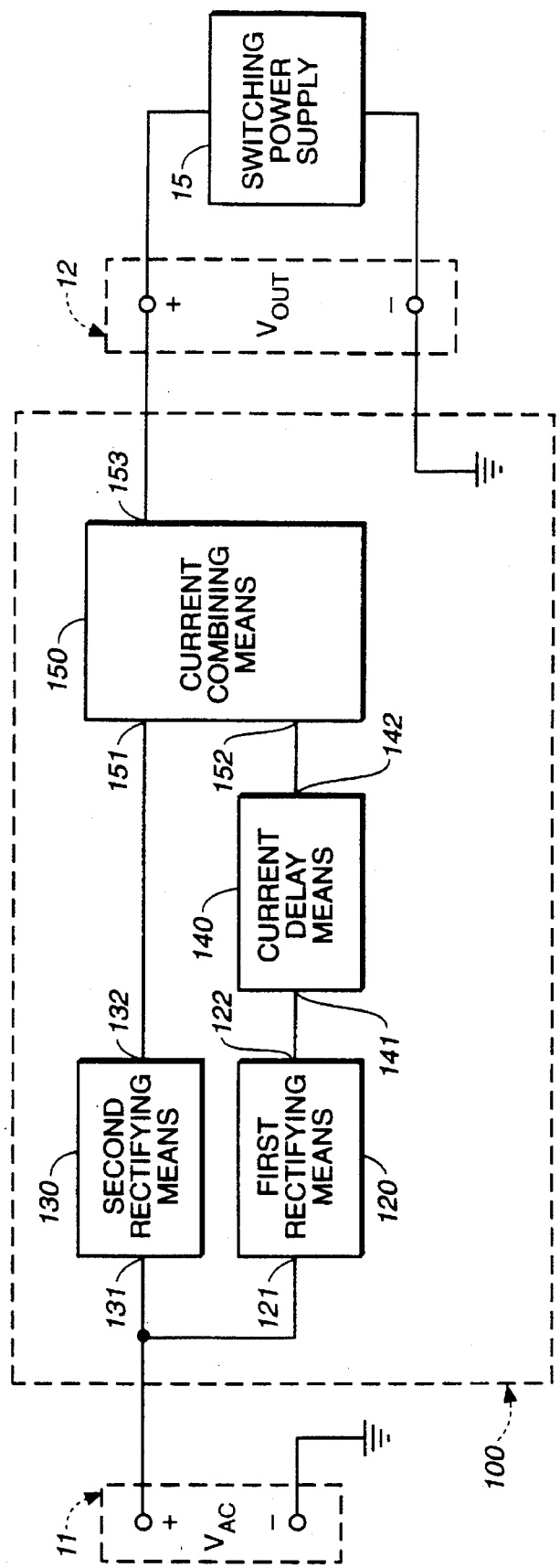
FIG._1

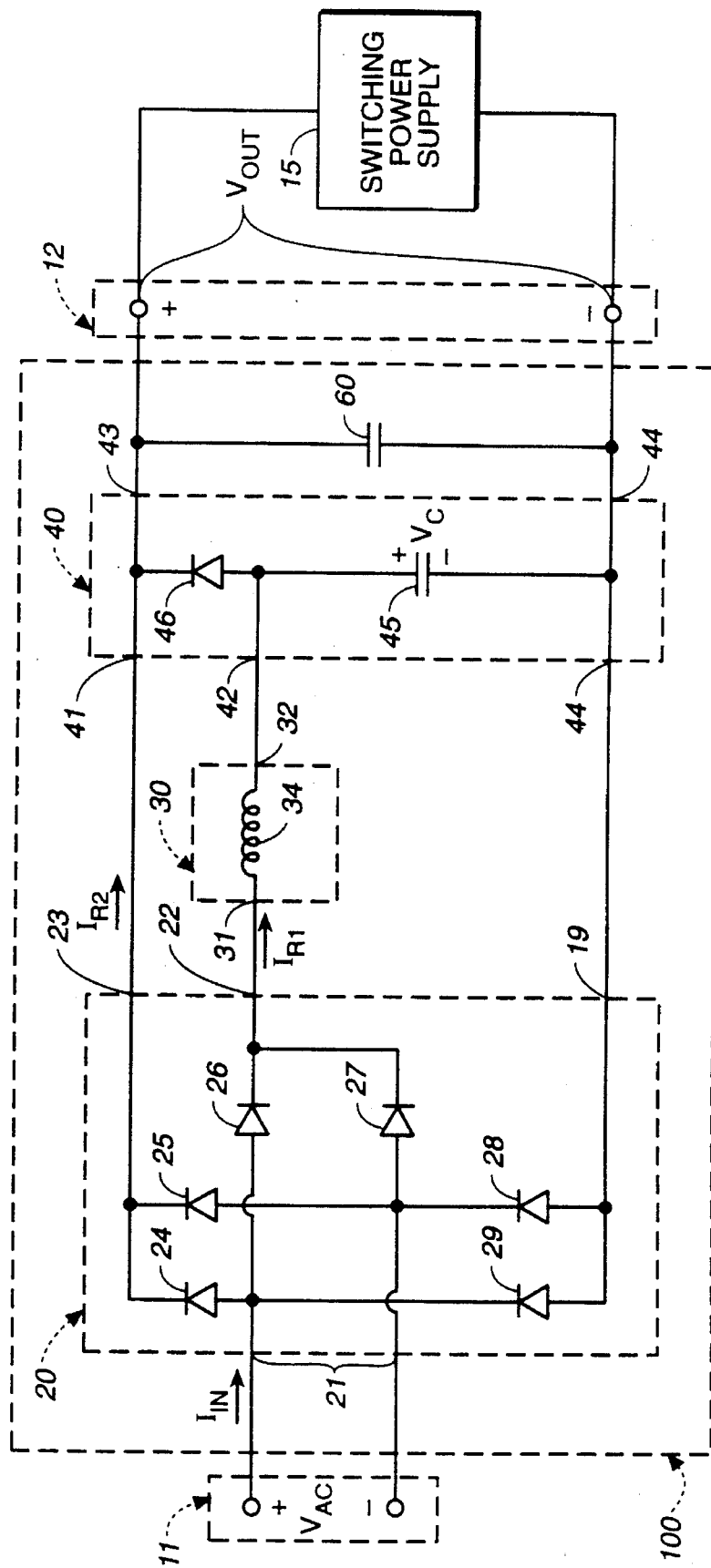
FIG._2

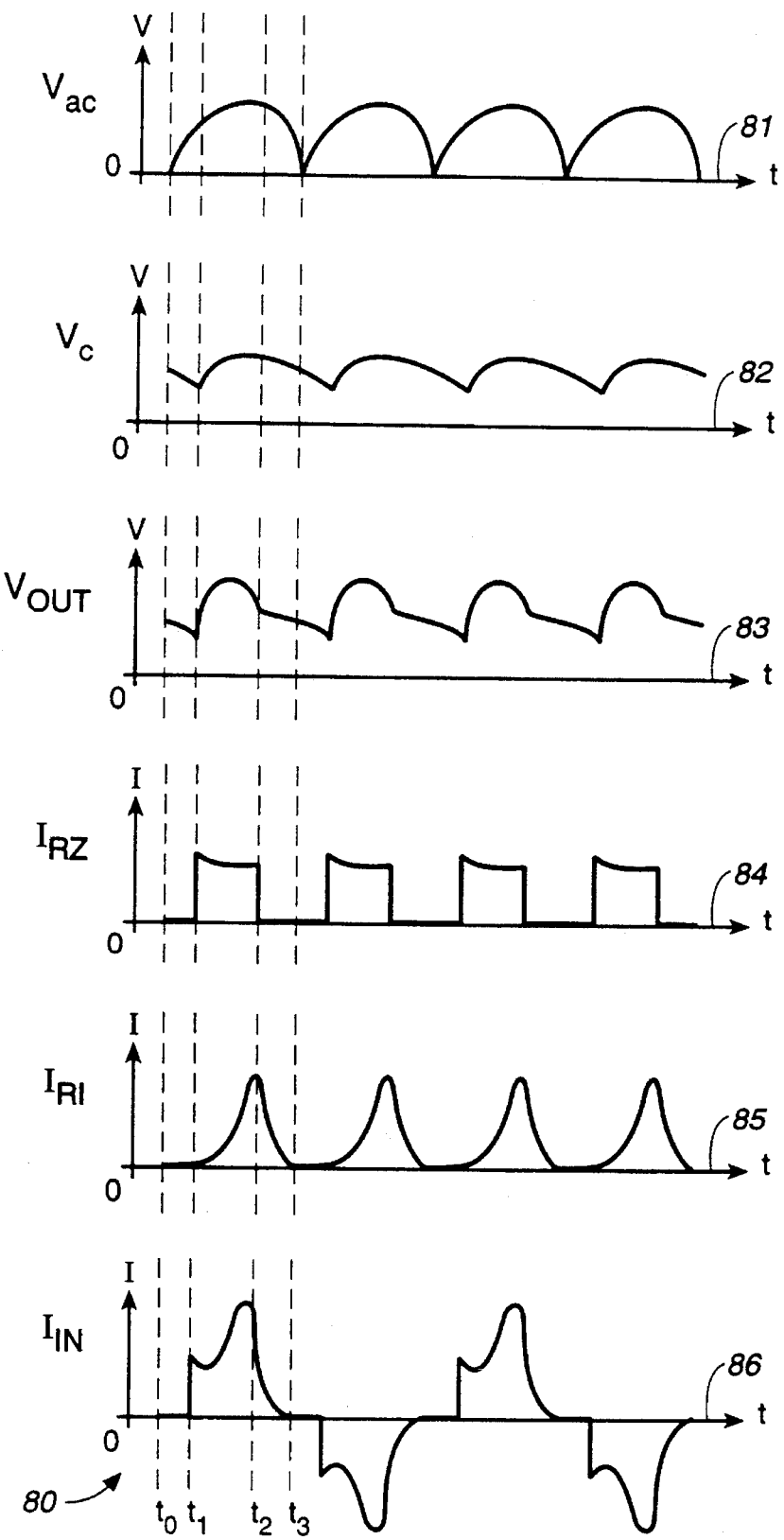
FIG._3

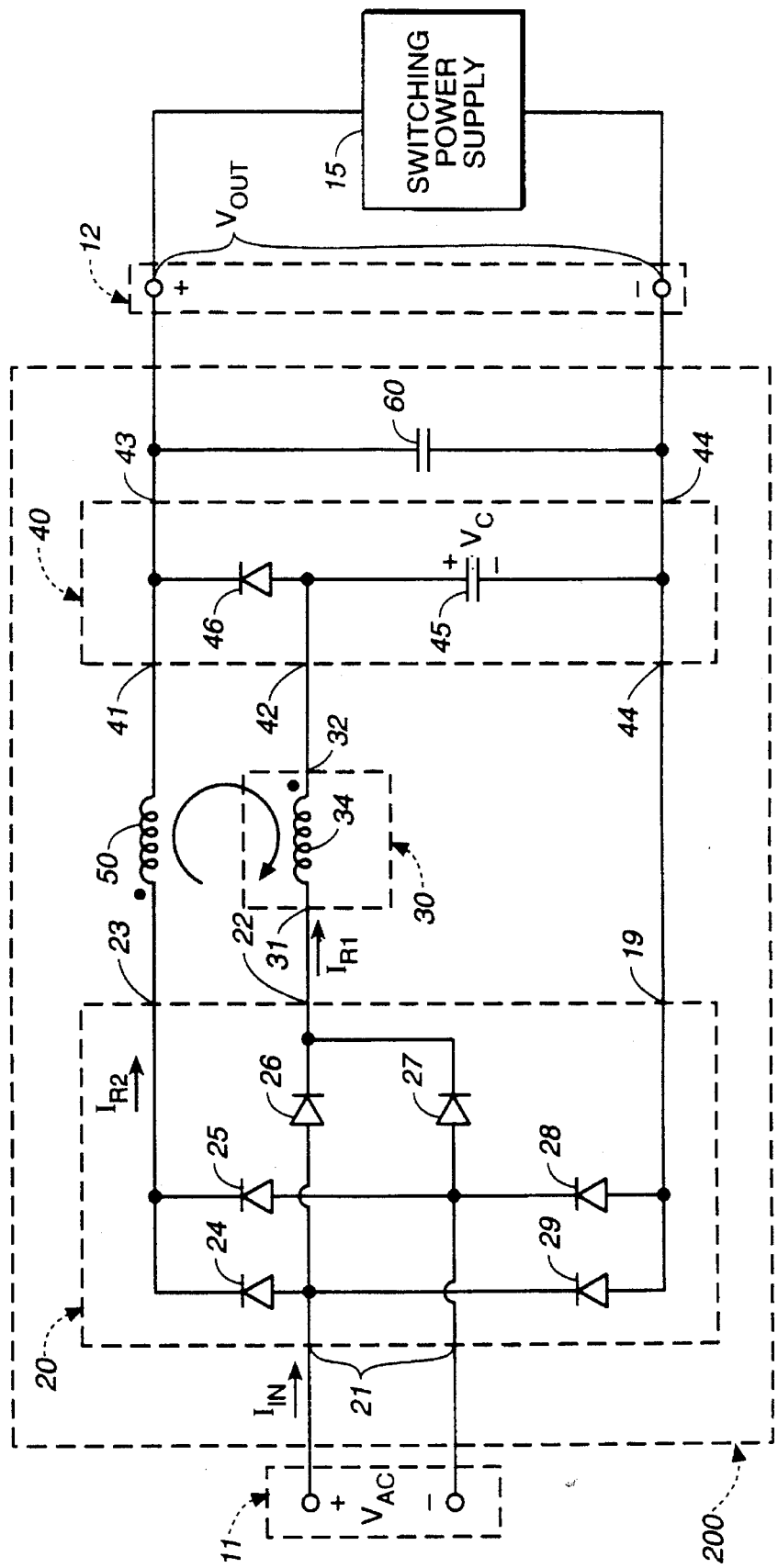
FIG._4

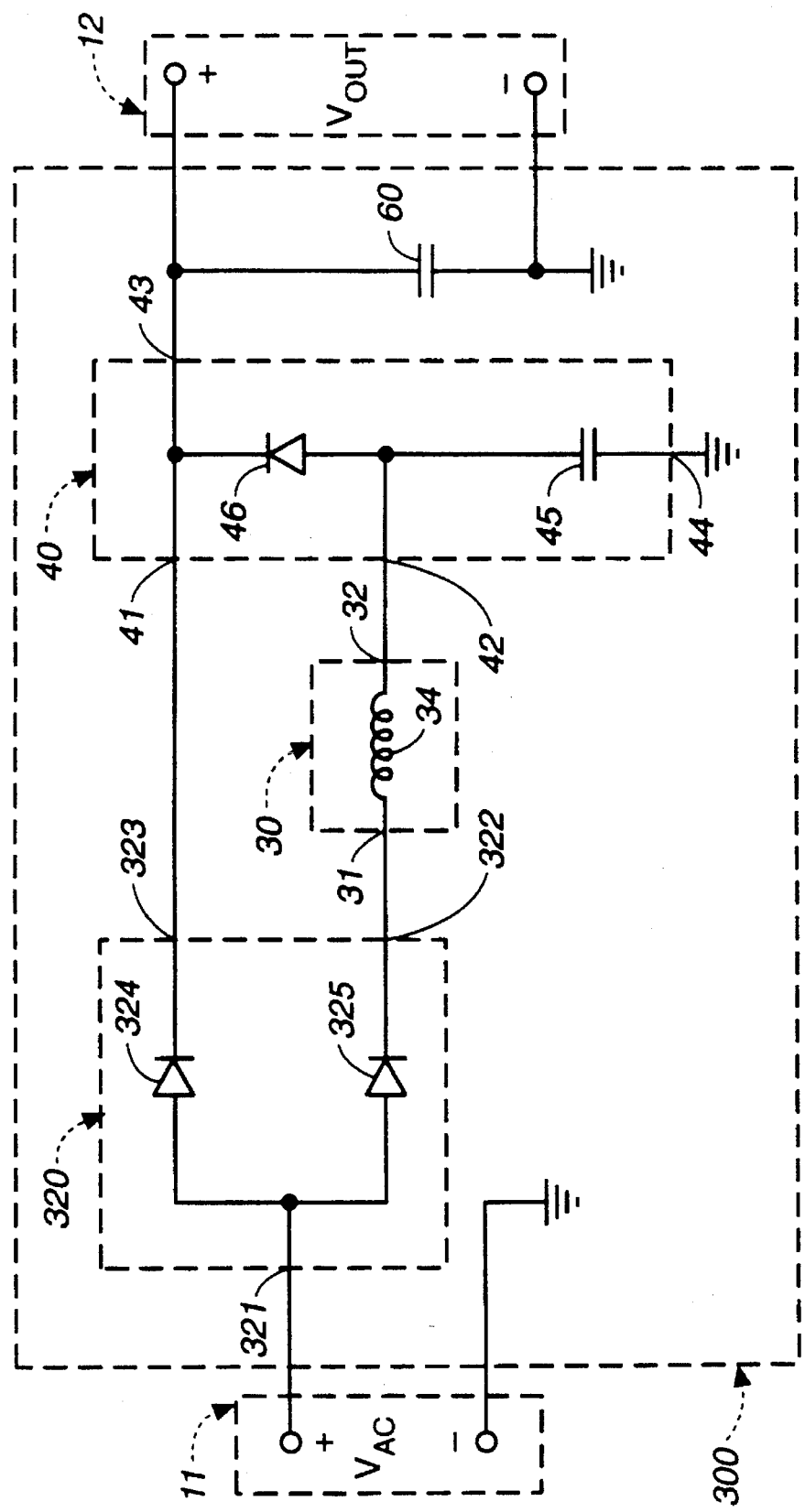
FIG._5

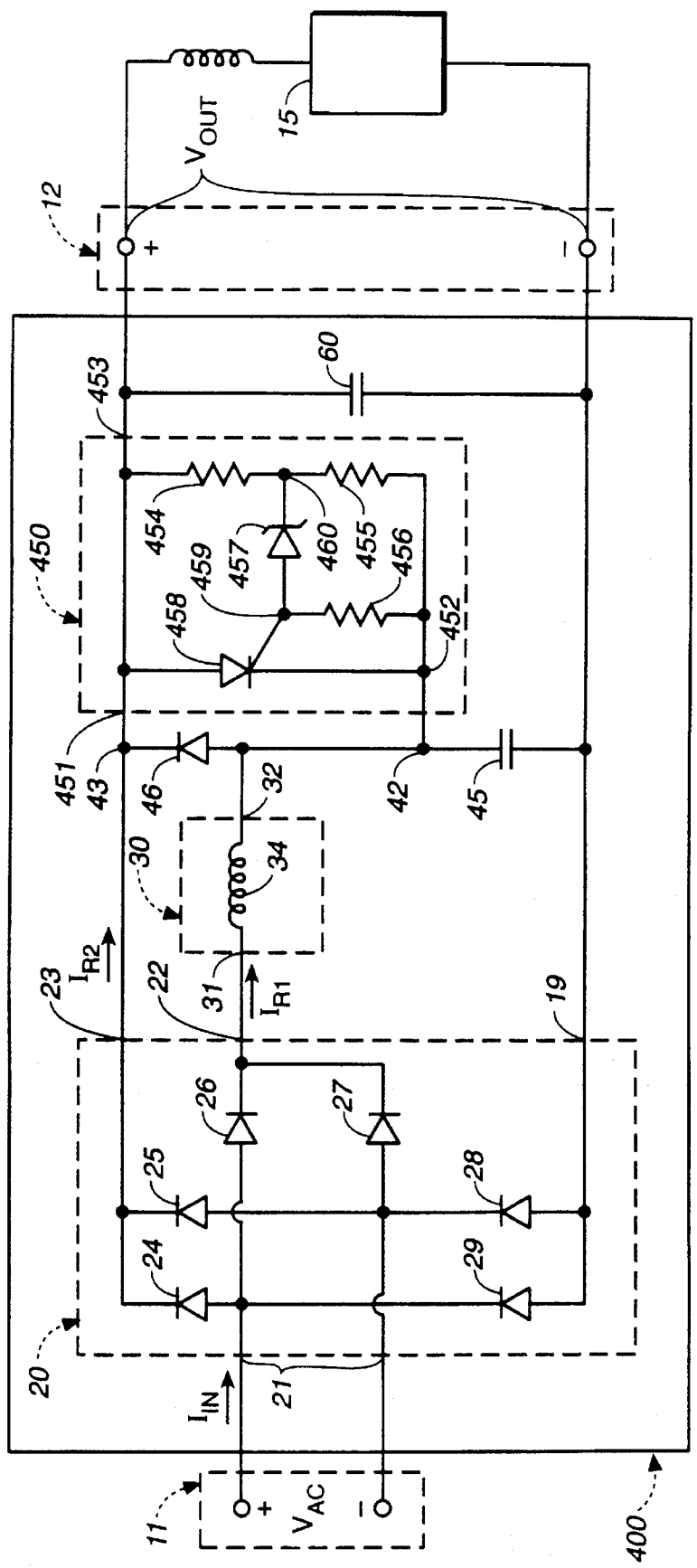
FIG._6

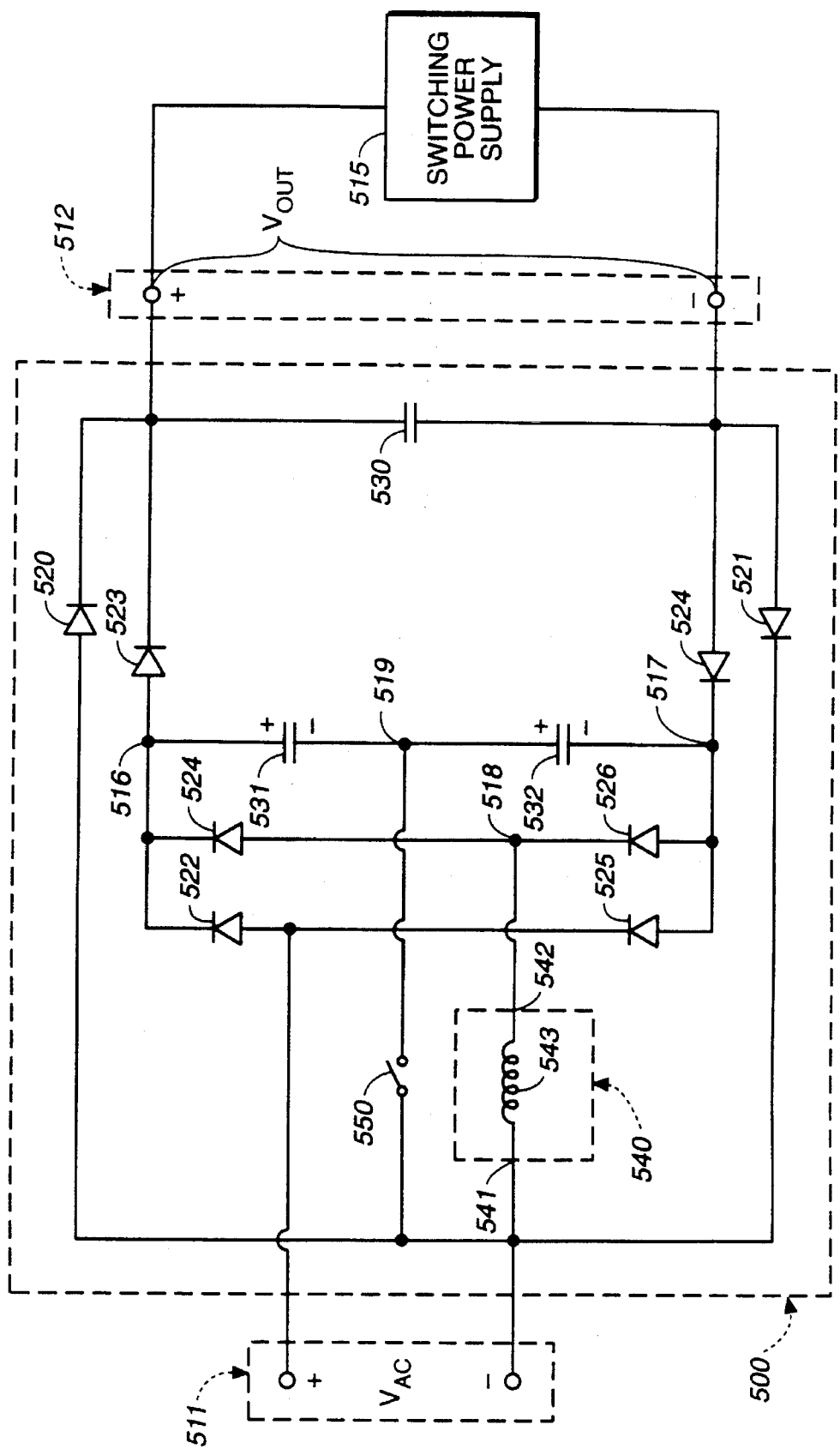
FIG._7

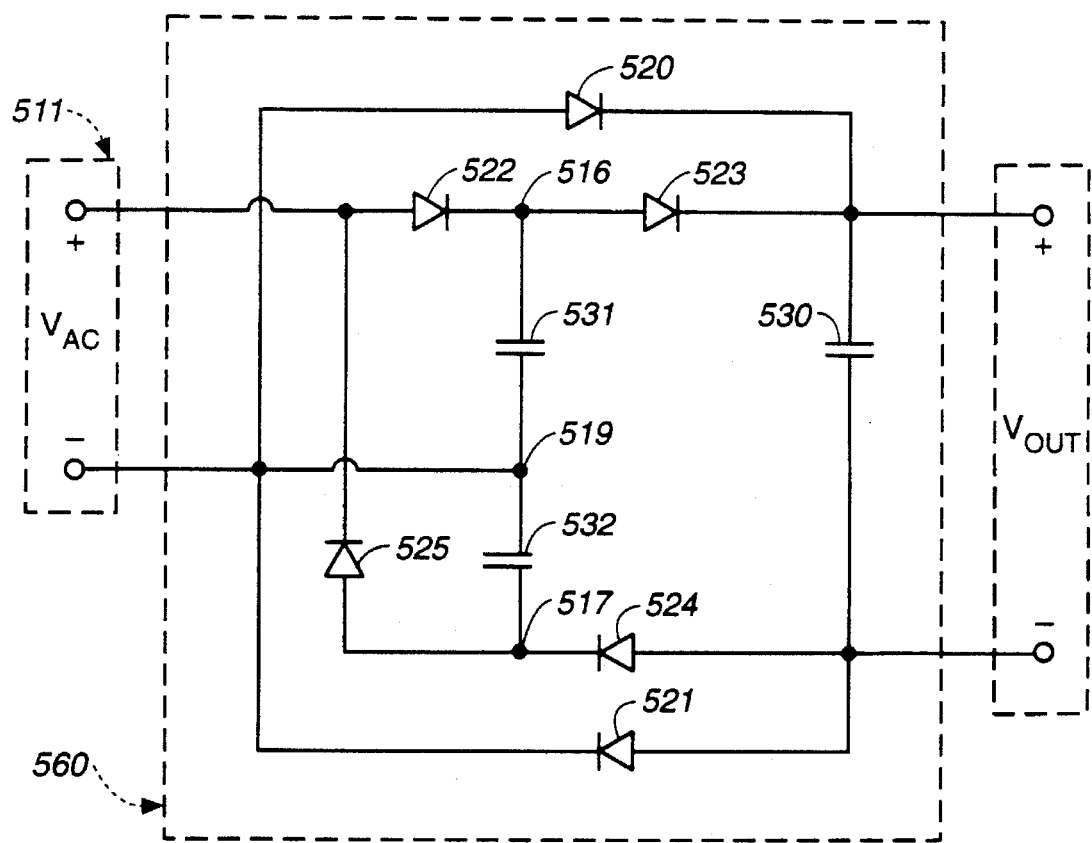
FIG._8

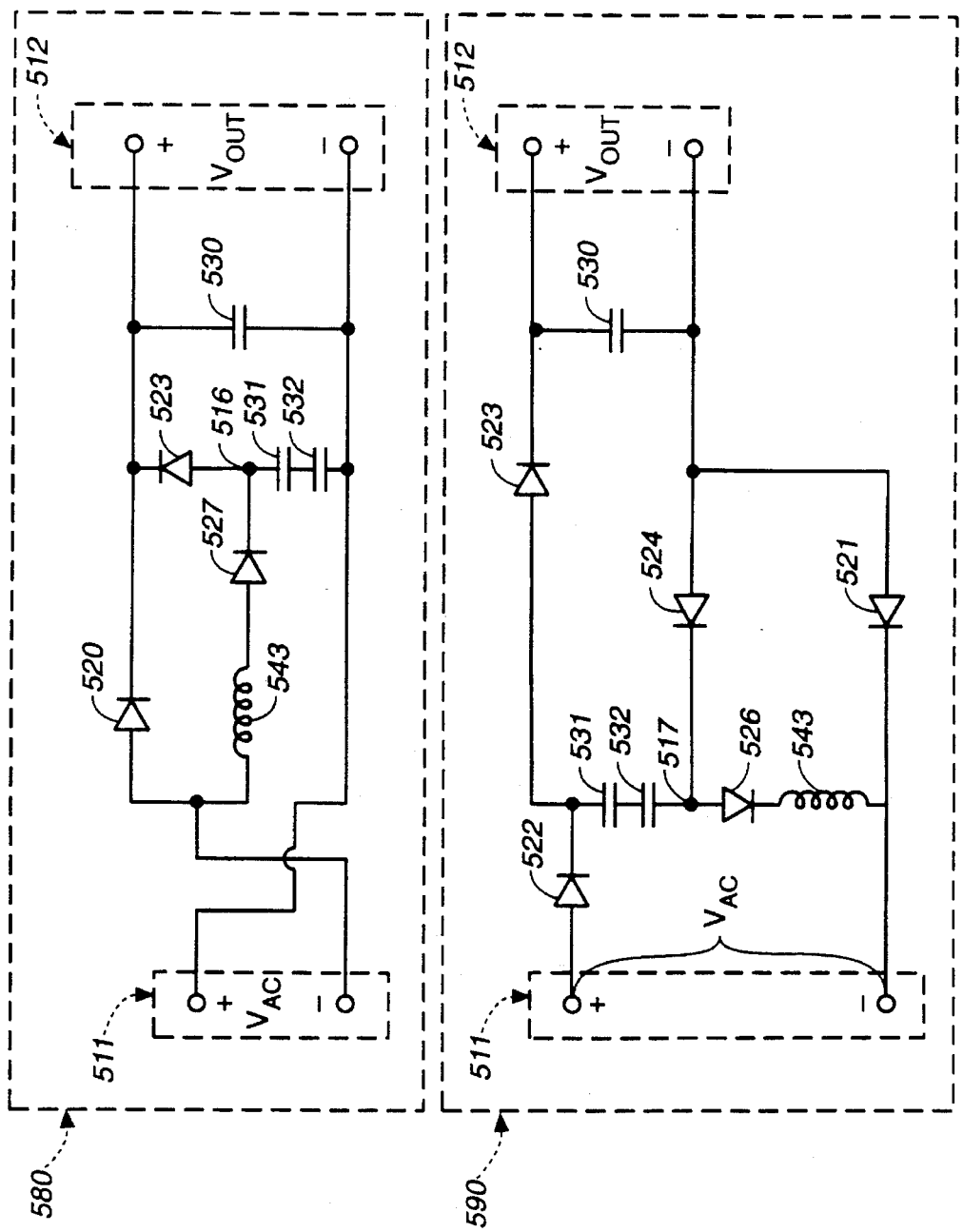
FIG._9

POWER FACTOR CORRECTED RECTIFYING CIRCUIT

This application is a continuation of application Ser. No. 08/018,874, filed Feb. 17, 1993, now abandoned.

FIELD OF THE INVENTION

The present invention relates to power factor correction circuitry, and more particularly to power factor correction circuits for switching power supplies.

BACKGROUND OF THE INVENTION

Many electronic devices, such as computers and many household appliances, commonly require that an alternating current line voltage be converted to one or more direct currents. Such electronic devices are ordinarily powered by a category of power supplies referred to as "switched power supplies," "switch mode power supplies" or "switching power supplies." All such power supplies will be referred to herein as "switching power supplies."

Many switching power supplies include a rectifier bridge which converts the input AC voltage to an unregulated DC voltage, also known as a rectified line voltage. These supplies also usually include a filtering capacitor coupled to the output of the rectifier bridge. This bridge-capacitor configuration leads to high currents near the peak of the AC voltage cycle, and substantially zero current around the zero-crossing points of the voltage cycle, causing a highly non-sinusoidal current waveform. As is known in the art, this non-sinusoidal current waveform can be decomposed into a set of harmonic sinusoids, each having an oscillation frequency equal to an integer multiple of the fundamental frequency of the input voltage. For example, with a 60 Hz input voltage frequency, such a current waveform would have harmonic frequencies at 60 Hz (the fundamental), 120 Hz, 180 Hz, 240 Hz, 300 Hz, etc.

As is known in the electrical power art, current harmonics above the fundamental frequency of the voltage do not contribute to the power drawn from a typical AC voltage source, with the result that the actual power drawn by the power supply is lower than the apparent power drawn. The explanation for this phenomenon is straightforward. The apparent power drawn is defined to be the product of the RMS voltage times the RMS current. The actual or "true" power is the integrated product of the instantaneous voltage and current, V*I, over a voltage cycle divided by the cycle's period. In accordance with the Fourier Series Theory, the integral of a fundamental harmonic with any other harmonic over one fundamental period is zero. Thus, assuming the input voltage is a sinusoid, the true power is simply the integral of the voltage sinusoid with the fundamental current harmonic, and the higher order current harmonics do not contribute to the true power. By contrast, all of the current harmonics contribute to the RMS value for the current; thus, the higher order harmonics do contribute to the apparent power drawn from the AC voltage source. Similarly, the apparent power is also higher than the true power when there is a phase difference between the voltage sinusoid and the fundamental current harmonic.

The distinction between apparent power and true power is important because power sources are rated according to the apparent power drawn rather than the true power drawn. As a basis of comparison, the true power and apparent power drawn by a device are divided to form a ratio called the "power factor," which is often abbreviated as "pf." The power factor of a device is broadly defined as:

$$\text{Power Factor} = \frac{\text{True Power}}{\text{Apparent Power}} = \frac{\frac{1}{T} \int_0^T V(t)*I(t)dt}{V_{RMS}*I_{RMS}}$$

where:

$$V_{RMS} = \left[ \frac{1}{T} \int_0^T [V(t)]^2 dt \right]^{1/2}$$

and $$I_{RMS} = \left[ \frac{1}{T} \int_0^T [I(t)]^2 dt \right]^{1/2}$$

The rectifier bridge and capacitor combination described above has a typical power factor in the range of 0.6–0.7.

Power factors less than about eighty percent can pose barriers to the performance or improvement of many types of electronic devices that operate on direct current, including such devices as personal computers, minicomputers, and appliances using microprocessors. For example, the high current peaks associated with low power factors can cause circuit breakers on the line voltage to trip, which limits system design in terms of the functional load it places on a standard line. Additionally, the harmonics associated with the high, non-sinusoidal current peaks result in power-line distortion, noise, and electromagnetic interference (EMI). In general, improving the power factor of the device reduces the harmonic content and electromagnetic noise. To address these problems, many regulating organizations, such as the International Electrotechnical Commission ("IEC"), have instituted or are planning to institute standards for controlling the harmonic content and electromagnetic noise generated by many electrical devices.

In order to raise power factors and attempt to comply with such regulations, manufacturers of computer systems and power supplies have begun to develop circuits for raising power factors and eliminating harmonic distortion. Such circuits are often referred to as power factor correction circuits. A number of power factor correction circuits exist in the prior art.

Existing power factor correction circuits are often relatively expensive because they use relatively complex circuit designs having active switching elements. While complex, active circuits can lead to substantial improvements in power factors, these circuits can be prohibitively expensive for a number of applications, particularly low power (<300 W) applications. Currently, the harmonic content and power factor of low power applications are not regulated by the IEC. The IEC is, however, considering regulating the harmonic content of such low power applications. If implemented, the current IEC proposal will effectively require power factors of at least about 0.80, well above the 0.6–0.7 value of the simple bridge-capacitor combination discussed above.

Accordingly, there is a need for a relatively inexpensive power factor correction circuit that will raise the power factor of a power supply and reduce the power-line distortion, noise, and EMI associated with a low power factor.

SUMMARY OF THE INVENTION

The present invention recognizes that the power factor of an electronic device such as the above bridge-capacitor circuit can be increased by increasing the width of the input current pulses to make the input current waveform approximate the input voltage waveform. This typically results in a more sinusoidal input current waveform, thereby reducing the magnitude of the current harmonics having a frequency greater than the fundamental.

Broadly stated, the present invention is a power factor corrected rectifying circuit comprising a first rectifying means for providing a first rectified current path between an alternating current power source input and an output, a second rectifying means for providing a second rectified current path between the input and the output, a current delay means for delaying the coupling of current through the first rectified current path, and a current combining means for combining the two current paths at the output. As the sum of the delayed current and the non-delayed current the total input current is more sinusoidal. This reduces the value of the high order current harmonics and increases the circuit's power factor.

In a preferred embodiment of the present invention, each of these means may be implemented with inexpensive "passive" components.

An object of the present invention is, therefore, to provide a power factor correction circuit that increases the power factor of electronic devices such as switching power supplies.

Another object of the present invention is to reduce the power-line noise, distortion, and EMI associated with a low power factor.

A further object of the present invention is to reduce the harmonic distortion of a switching power supply's input current.

Yet another object of the present invention is to provide a power factor correction circuit of lower cost than those relying on complex designs or active circuit elements.

Still another object of the present invention is to provide a power factor correction circuit for use with switching power supplies that will allow the power supplies to meet existing or anticipated standards for harmonics, power-line distortion, or noise.

Still another object of the present invention is to provide a power factor correction circuit that will reduce barriers to system design caused by low power factors.

These and other objects of the present invention will become apparent to those skilled in the art from the following detailed description of the invention and preferred embodiments, the accompanying drawings, and the appended claims.

BRIEF DESCRIPTION OF THE DRAWINGS

FIG. 1 is a block diagram of a first embodiment of the power factor corrected rectifying circuit according to the present invention;

FIG. 2 is a combined block and schematic diagram of a second embodiment of a power factor corrected rectifying circuit according to the present invention;

FIG. 3 is a timing diagram of key voltages and current of the power factor corrected rectifying circuit according to the present invention shown in FIG. 2;

FIG. 4 is a circuit diagram of a third embodiment of the power factor corrected rectifying circuit according to the present invention;

FIG. 5 is a circuit diagram of a fourth embodiment of the power factor corrected rectifying circuit according to the present invention;

FIG. 6 is a circuit diagram of a fifth embodiment of the power factor corrected rectifying according to the present invention;

FIG. 7 is a circuit diagram of a sixth embodiment of the power factor corrected rectifying circuit according to the present invention;

FIG. 8 is a circuit diagram of equivalent circuits for the embodiment of the present invention shown in FIG. 7 wherein $V_{ac}$ is in the 110 volt range;

FIG. 9 is a circuit diagram of equivalent circuits for an embodiment of the present invention shown in FIG. 7 wherein $V_{ac}$ is in the 220 volt range.

DETAILED DESCRIPTION OF THE INVENTION AND PREFERRED EMBODIMENTS

A block diagram of a power factor corrected rectifying circuit according to the present invention is shown at 100 in FIG. 1. Power factor corrected rectifying circuit 100 includes a power input port 11 for receiving an alternating current source of power, and an output port 12 for coupling a rectified output signal to a load, such as a switching power supply. An exemplary switching power supply coupled to port 12 is shown at 15 in FIG. 1. Port 11 has a positive terminal for receiving the AC signal and a negative terminal for receiving the neutral return line for the AC signal. These two terminals are indicated with the symbols "+" and "−", respectively, in FIG. 1. Port 12 has a positive terminal and a negative terminal for providing the rectified DC output current of rectifying circuit 100. These terminals are also indicated with the symbols "+" and "−," respectively, in FIG. 1.

Additionally, power factor corrected rectifying circuit 100 comprises a first rectifying means 120 coupled to power input port 11 for providing a first rectified current path between port 11 and port 12, and a second rectifying means 130 for providing a second rectified current path between port 11 and port 12. Rectifying means 120 includes an input 121 coupled to power input port 11 and an output 122 for providing a first rectified current. Rectifying means 130 includes an input 131 coupled to power input port 11 and an output 132 for providing a second rectified current.

Rectifying circuit 100 further comprises a current delay means 140 coupled to output 122 for delaying the coupling of current through output 122 with respect to the voltage signal at power input port 11. Current delay means 140 includes a delayed current input 141 coupled to current output 122 for receiving the first rectified current and a delayed current output 142. Rectifying circuit 100 further comprises a current combining means 150 for coupling the first rectified current and the second rectified current to output 12. Current combining means 150 has a first input 151 coupled to output 132, a second input 152 coupled to output 142 and an output 153 coupled to output port 12.

A general description for the functional blocks of power factor corrected rectifying circuit 100 according to the present invention has thus far been given. The operation of the present invention will be described further below.

A circuit diagram for a preferred embodiment of rectifying circuit 100 is shown at 10 in FIG. 2. In this embodiment of the present invention, rectifying means 120 and rectifying means 130 collectively comprise a rectifying means 20, which comprises six rectifiers 24-29 configured as two overlapping full-wave rectifying bridges. A first rectifying bridge for providing rectified current to first rectified current output 22 is formed by rectifiers 26–29, and a second rectifying bridge for providing rectified current to second rectified current output 23 is formed by rectifiers 24, 25, 28, and 29. Rectifiers 28 and 29 are common to both bridges. More specifically, rectifier 24 is coupled between the positive terminal of port 11 and second rectified current output 23 such that current may be conducted from power input port 11 to second rectified current output 23 when rectifier 24 is forward biased, such as when the voltage signal at power input port 11 is sufficiently positive. Rectifier 25 is coupled between the negative terminal of port 11 and second rectified current output 23 such that current may be conducted from power input port 11 to second rectified current output 23 when rectifier 25 is forward biased, such as when the voltage signal at power input port 11 is sufficiently negative. Rectifier 26 is coupled between the positive terminal of input port 11 and first rectified current output 22 such that current may be conducted from port 11 to output 22 when rectifier 26 is forward biased, such as when the voltage signal at power input port 11 is sufficiently positive. Rectifier 27 is coupled between the negative terminal of power input port 11 and first rectified current output 22 such that current may be conducted from power input port 11 to first rectified current output 22 when rectifier 27 is forward biased, such as when the voltage signal at power input port 11 is sufficiently negative. Rectifier 28 is coupled between the negative terminal of port 11 and return port 19 such that return current may flow towards power input port 11. Finally, rectifier 29 is coupled between the positive terminal of input port 11 and return port 19 such that return current may flow towards power input port 11. With this configuration, each positive voltage half-cycle at port 11 is coupled to each of outputs 22 and 23 as a positive voltage half-cycle. Additionally, each negative voltage half-cycle at port 11 is coupled to each of outputs 22 and 23 as a positive voltage half-cycle.

In this embodiment of the present invention, current delay means 30 comprises an inductor 34. Inductor 34 is coupled between current input 31 and current output 32 of current delay means 30.

In operation, rectifying means 20 generates voltage half-cycles at outputs 22 and 23 from the input AC voltage, as explained above. For each voltage half-cycle at output 22, current begins to flow to inductor 34 when the voltage of the half-cycle reaches a value exceeding the voltage at output 32. When this occurs, a positive voltage is developed across inductor 34 and current flows according to the well known differential equation V=LdI/dt. Because the rate of change in an inductor's current is proportional to the voltage across the inductor, the current drawn by inductor 34 lags, or is delayed from, the half-cycle voltage. Energy is stored in inductor 34 and is coupled to port 12 by a current combining means 40, as described more fully below.

The current at output 23 does not pass through delay means 30 and is, therefore, more closely in phase with the half-cycle voltage at output 23 than is the current at output 22. Accordingly, the current at output 22 lags the current at output 23. The current drawn from the AC input at any time is equal to the sum of the current at output 22 and the current at output 23. Thus, delaying the current at output 22 without delaying the current at output 23 results in a wider current pulse at the AC input. For the reasons explained above, such a wider current pulse results in improvement of the power factor for rectifying circuit 10 over the conventional bridge and capacitor combination discussed above.

A current combining means 40 accepts current from each of its inputs 41 and 42 and selectively directs each to its output 43. Preferably, combining means 40 prevents each of the input currents from flowing into the other input. In this embodiment of the present invention, combining means 40 comprises an electrical coupling from input 41 to output 43, a capacitor 45 coupled between input 42 and reference port 44, and a rectifier 46 coupled between input 42 and output 43. Capacitor 45 is charged with current from first rectified current output 22 that has passed through inductor 34. Charge stored on capacitor 45 is selectively coupled to output port 12 by way of rectifier 46 and output 43. Capacitor 45 preferably maintains a positive voltage, which, for example, may be in a range of approximately 50% to 80% the peak input voltage at port 11. Rectifier 46 is oriented to conduct current from input 42 to output 43 when it is forward biased. This occurs when the voltage at input 42 is higher than the voltage at input 41. Rectifier 46 prevents current from input 41 from entering input 42. Rectifiers 24 and 25 of rectifying means 20 prevent current from input from entering input 41. (In this regard, a rectifier similar to rectifier 46 could be added in the branch between input 41 and output 43 but is redundant in this embodiment, as rectifiers 24 and 25 provide the blocking function.)

Optionally, a capacitor 60 is included in a preferred embodiment of the present invention and is coupled between the positive and negative terminals of output port 12 as an output smoothing filter. Capacitor 60 preferably has a capacitance value which is smaller than the capacitance of capacitor 45.

A table showing exemplary values for the elements of circuit 10 when the input power is below 250 watts is shown below as Table 1 to aid one of ordinary skill in the art to make and use the present invention.

TABLE 1

| Vac | 220 V Range |
|---|---|
| Rectifiers 24–25 | RG3K |
| Rectifiers 26–29 | GBV8K |
| Inductor 34 | 19 mH, |
|  | EE 42–15 core, |
|  | Iron powder core, |
|  | AWG #23, 395 Turns |
| Capacitor 45 | 220 µF |
| Capacitor 60 | 0.47 µF |

Designations for key voltages and currents of rectifying circuit 10 are shown in FIG. 2. The input voltage source is designated as $V_{AC}$ and the input AC current is denoted as $I_{IN}$. These designations are shown close to port 11. Likewise, the output voltage at port 12 is designated as $V_{OUT}$. The input current drawn from output 22 of rectifying means 20 is designated as $I_{R1}$, and the current drawn from output 23 is designated as current $I_{R2}$.

A timing diagram showing exemplary waveforms for each of these voltages and currents is shown at 80 in FIG. 3. Timing diagram 80 includes graphs 81 through 86 for showing these voltages and currents as a function of time. Graph 81 shows the absolute value of the input voltage $|V_{AC}|$, graph 82 shows the voltage developed across capacitor 45 $V_C$, graph 83 shows the output voltage $V_{OUT}$, graph 84 shows the current $I_{R2}$, graph 85 shows the current $I_{R1}$, and graph 86 shows the input current $I_{IN}$.

In addition to graphs 81 through 86, timing diagram 80 comprises 4 vertical time lines, $t_0$, $t_1$, $t_2$, and $t_3$, each of which runs vertically through graphs 81–86. The operation of an exemplary embodiment of rectifying circuit 10 is further explained with reference to these timing diagrams.

Time $t_0$ occurs at the beginning of a positive half-cycle of the input voltage $V_{AC}$, and time $t_3$ occurs at the end of the positive voltage half-cycle. From time $t_0$ to $t_1$, the magnitude of the input voltage increases. Additionally, the output voltage $V_{OUT}$ is larger than the rectified AC input voltage. Because of this, current $I_{R2}$ from Output 23 (cf. graph 85) does not flow to output port 12. Instead, current from capacitor 45 flows to output port 12 through rectifier 46 of combining means 40. As can be seen by comparing graphs 82 and 83, the output voltage $V_{OUT}$ follows the capacitor voltage $V_C$ during time interval $t_0$ to $t_1$. Also during this time, the voltage across capacitor 45 is greater than the magnitude of the rectified input voltage. Because of this, current $I_{R1}$ does not flow from output 22 into inductor 34. Accordingly, both currents $I_{R1}$ and $I_{R2}$ are zero during this time (cf. graphs 84 and 85), and the total input current $I_{IN}$ is also zero (cf. graph 86).

At time $t_1$, the magnitude of the rectified input voltage becomes substantially equal to the capacitor voltage $V_C$. In response to this, rectifier 46 becomes non-conducting and decouples capacitor 45 from port 12. The current demand from the load, such as switching power supply 15, is now provided from the rectified current from output 23, current $I_{R2}$. This current is shown in graph 84, and its waveform depends upon the current requirements of the load. In graph 84, the current demand for a switching mode power supply having a switching frequency of around 30 kHz is shown as an example. The envelope of the current is shown in a dark line. The 30 kHz switching is too fine to show in FIG. 5 but is represented by shading.

Also at time $t_1$, a positive voltage is developed across inductor 34 and current begins to flow therethrough. The inductor current recharges capacitor 45 and is shown in graph 85 as current $I_{R1}$.

From time $t_1$ to $t_2$, the magnitude of the input voltage progresses through the sinusoidal trajectory and remains substantially above the voltage across equal to the voltage across capacitor 45. Current $I_{R2}$ then falls to zero and capacitor 45 supplies current and power to port 12 (cf. graph 84).

Between time $t_1$ and $t_2$, the current through inductor 34 charges up to a peak value at time $t_2$. The current flowing during this time charges capacitor 45. As shown in graph 82, capacitor voltage $V_C$ increases during this time.

From time $t_2$ to $t_3$, current $I_{R2}$ decreases as the energy stored in inductor 34 is transferred to combining means 40 until its magnetic energy is discharged. Capacitor 45 continues to supply current to output port 12.

Currents $I_{R1}$ and $I_{R2}$ combine to provide the total input current $I_{IN}$, which is shown in graph 86. As can be seen in graph 85, the current pulses in current $I_{R1}$ are delay-shifted from the peak of the AC input voltage, and provide current in the total input current $I_{IN}$ during time interval $t_1$–$t_3$. This broadens out the current input pulses and increases the power factor of rectifying circuit 10.

The operation during a negative voltage half-cycle is substantially similar to the operation during the positive voltage half-cycle described above.

An additional embodiment of the power factor corrected rectifying circuit of the present invention is shown at 200 in FIG. 4. Except for an additional inductor 50, power factor corrected rectifying circuit 200 comprises the same elements of rectifying circuit 10 shown in FIG. 2. Accordingly, the numbering of each of these elements shown in FIG. 4 corresponds to their numbering in FIG. 2. Inductor 50 is electrically coupled between output 23 of rectifying means 20 and input 41 of combining means 40. Additionally, inductor 50 is magnetically coupled to inductor 34. Inductor 50, coupled in this manner, filters any high frequency noise that may be present at output port 12 and substantially prevents the noise from being transmitted back to input port 11. Such noise is generated by typical switching power supplies that may be coupled to output port 12 as shown in FIG. 4.

Although full-wave bridge rectifier circuits have been shown for rectifying means 20, it may be appreciated that half-wave rectifiers may instead be used. A further embodiment of the present invention using half-wave rectifiers is shown at 300 in FIG. 5. Rectifying circuit 300 comprises ports 11 and 12, current delay means 30, and current combining means 40, as described above with reference to rectifying circuit 10. Additionally, in place of rectifying means 20, rectifying circuit 300 comprises a rectifying means 320 having an input port 321 coupled to port 11, and two outputs 322 and 323, corresponding to outputs 22 and 23 of rectifying means 20, for providing separate rectified currents.

Rectifying means 320 of power factor corrected rectifying circuit 300 comprises two rectifiers: rectifier 324 and rectifier 325. Rectifier 324 is coupled between the positive terminal of power input port 11 and second output 323 such that current may be conducted from input port 11 to output 323 when it is forward biased, such as when the voltage signal at power input port 11 is sufficiently positive. Likewise, rectifier 325 is coupled between the positive terminal of power input port 11 and first output 322 such that current may be conducted from input port 311 to output 322 when the voltage signal at power input port 311 is sufficiently positive. The negative terminal of port 11 is coupled to ground, which is also coupled to port 44 of means 40 and the negative terminal of output port 12. Current is returned from outputs 322 and 323 by way of the ground.

An additional embodiment of the power factor corrected rectifying circuit of the present invention is shown at 400 in FIG. 6. Except for transient energy reduction means 450, power factor corrected rectifying circuit 400 comprises the same elements of rectifying circuit 10 shown in FIG. 2. Accordingly, the numbering of each of these elements shown in FIG. 6 corresponds to their numbering in FIG. 2. The purpose of transient energy reduction means 450 is to prevent transient voltage signals with high peaks from coupling to output 12.

Transient energy reduction means 450 has a first input 451 coupled to output 43 of current combining means 40, a second input 452 coupled to input 42 of current combining means 40 and an output 453 coupled to output port 12.

Transient energy reduction means 450 comprises resistors 454–456, zener diode 457, silicon controlled rectifier 458, and nodes 459 and 460. Resistor 454 is coupled between output 453 and 460. Resistor 455 is coupled between node 460 and input 452. Resistor 456 is coupled between node 459 and input 452. Zener diode 457 is coupled between node 459 and node 460 such that current may be conducted from node 460 to node 459 when the voltage at node 460 exceeds the voltage at node 450 by a sufficient amount. Rectifier 458 is coupled to input 451, input 452, and node 459 such that the anode of rectifier 458 is coupled to input 451, the cathode of rectifier 458 is coupled to input 452, and the gate is coupled to node 459. It may be appreciated that high voltage peaks at input 451 will cause the voltage at node 460 to rise. When the voltage at node 460 is sufficient, current will flow from node 460 to node 459, which will cause rectifier 458 to allow current to flow directly from input 451 to input 452, thereby reducing the peak voltage coupled to the output port.

An additional embodiment of the present invention is shown at 500 in FIG. 7. Power factor corrected rectifying circuit 500 is a circuit that can act either as a simple rectifier with an output capacitor filter or as a power factor corrected rectifying circuit. In a preferred embodiment, circuit 500 is designed to operate as a simple rectifier when the AC input voltage is in the 110 volt range and as a power factor corrected rectifying circuit when the AC input voltage is in the 220 volt range.

Power factor corrected rectifier circuit 500 includes a power input port 511 for receiving an alternating current source of power, and an output port 512 for coupling a rectified output signal to a load, such as a switching power supply. An exemplary switching power supply coupled to port 512 is shown at 515 in FIG. 7. Port 511 has a positive terminal for receiving the AC signal and a negative terminal for receiving the neutral return line for the AC signal. These two terminals are indicated with the symbols "+" and "−," respectively, in FIG. 7. Port 512 has a positive terminal and a negative terminal for providing the rectified DC output current and "−" respectively, in FIG. 7.

Additionally, rectifying circuit 500 comprises four nodes 516–519, eight rectifiers 520–527, two capacitors 531–532, a current delay means 540, and a switching means 550. An optional capacitor is shown at 530 in FIG. 7.

Rectifiers 520–527 are arranged to function as fullwave rectifiers whether circuit 500 is operating in the 110 voltage range or the 220 volt range. Rectifier 520 is coupled between the negative terminal of port 511 and the positive terminal of port 512 such that current may be conducted from port 511 to port 512 when rectifier 520 is forward biased. Rectifier 521 is coupled between the negative terminal of port 512 and the negative terminal of port 511 such that current may be conducted from port 512 to port 511 when rectifier 521 is forward biased. Rectifier 522 is coupled between the positive terminal of port 511 and node 516 such that current may be conducted from port 511 to node 516 when rectifier 522 is forward biased. Rectifier 523 is coupled between node 516 and the positive terminal of port 512 such that current may be conducted from node 516 to port 512 when rectifier 523 is forward biased. Rectifier 524 is coupled between the negative terminal of port 512 and node 517 such that current may be conducted from port 512 to node 517 when rectifier 524 is forward biased. Rectifier 525 is coupled between node 517 and the positive terminal of port 511 such that current may be conducted from node 517 to port 511 when rectifier 525 is forward biased. Rectifier 526 is coupled between node 517 and node 518 such that current may be conducted from node 517 to node 518 when rectifier 526 is forward biased. Rectifier 527 is coupled between node 518 and node 516 such that current may be conducted from node 518 to node 516 when rectifier 527 is forward biased.

Capacitor 530 is optionally coupled between the positive and negative terminals of port 512. Capacitor 531 is coupled between node 516 and node 519. Capacitor 532 is coupled between node 517 and node 519.

Current delay means 540 has a first port 541 coupled to the negative terminal of port 511 and a second port 542 coupled to node 518. The purpose of delay means 540 is to delay conduction of current from the negative terminal of port 511 to node 518 and to delay conduction of current from node 518 to the negative terminal of port 511. In a preferred embodiment of rectifying circuit 500, delay means 540 comprises an inductor 543 coupled between port 541 and port 542.

Switching means 550 is coupled between the negative terminal of port 511 and node 519. Switching means 550 has a first state which allows current to be conducted through switching means 550 in either direction and a second state in which current cannot be conducted through switching means 550 in either direction.

In a preferred embodiment, switching means 550 is in the first state when an AC voltage at port 511 is in the 110 volt range, and switching means 550 is in the second state when an AC voltage at port 511 is in the 220 volt range.

When switching means 550 is in the first state, rectifying circuit 500 functions as a simple rectifying circuit with an output filter capacitor. The equivalent circuit illustrating the operation of rectifying circuit 500 when switching means 550 is in the first state are shown in FIG. 8 at 560. The numbering of each element of equivalent circuit 560 corresponds to its numbering in FIG. 7. Equivalent circuit 560 contains only those elements which significantly affect the flow of current and through which current flows when switching means 550 is in the first state. The operation of circuit 500 in the first state is described briefly below. When the voltage at the positive terminal of port 511 is positive and does not exceed the voltage across capacitor 531, rectifier 522 is reverse-biased and no current will flow from port 511. When the voltage at the positive terminal of port 511 exceeds the voltage across capacitor 531, current is conducted from the positive terminal at port 511 to node 516. From node 516, a portion of the current flows through capacitor 531 to node 519, and from node 519 through switching means 550 to the negative terminal of port 511. The remainder of the current passing through node 516 flows to the positive terminal of port 512 and returns to the negative terminal of port 511 without passing through delay means 540. Similarly, when the voltage at the positive terminal of port 511 is negative, current is conducted from port 511 to node 519 and the positive terminal of port 512 and returns to the positive terminal of port 511 without passing through delay means 540.

When switching means 550 is in the second state, rectifying circuit 500 functions as a power factor corrected rectifying circuit. The equivalent circuits illustrating the operation of rectifying circuit 500 when switching means 550 is in the second state are shown in FIG. 9 at 580 and 590. The numbering of each element of equivalent circuits 580 and 590 correspond to their numbering in FIG. 7. Equivalent circuit 580 contains only those elements which significantly affect the flow of current and through which current flows during a negative voltage half-cycle when switching means 550 is in the second state. Equivalent circuit 590 contains only those elements which significantly affect the flow of current and through which current flows during a positive voltage half-cycle when switching means 550 is in the second state.

It is apparent that equivalent circuit 580 is a near equivalent to circuit 300 in FIG. 4, with the exception that the positions of inductor 543 and rectifier 527 of circuit 580 are reversed in comparison with inductor 34 and rectifier 325 of circuit 300, and the further exception that capacitor 531 and capacitor 532 of circuit 580 take the place of the single capacitor 45 of circuit 300. It may be appreciated by one skilled in the art that circuit 580 functions substantially the same as circuit 300 which was described above. Thus, the operation of circuit 580 will not be described further here.

It may be appreciated that circuit 590 also functions as a power factor corrected rectifier circuit. In circuit 590, current flows from port 511 to port 512 when the voltage at the positive terminal of port 511 exceeds the voltage across capacitors 531 and 532. When the voltage at port 511 falls to the level of the voltage across capacitors 531 and 532, inductor 543 draws a current pulse from port 511, which widens the input current waveform as described above in connection with other combinations of the present invention.

While the present invention has been particularly described with respect to the illustrated embodiments, it will be appreciated that various alterations, modifications, and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, to the contrary, is intended to cover various modifications and equivalent arrangements included within the scope of the appended claims.

What is claimed is:

1. A power factor corrected rectifying circuit comprising:
   a power input port for receiving an AC power source having an input voltage and an input current;
   a power output port;
   a first rectifying means for providing a first rectified current path between said power input port and said power output port;
   a second rectifying means for providing a second rectified current path between said power input port and said power output port, said rectified current paths being capable of simultaneously conducting current;
   a current delay means in said first rectified current path for delaying the coupling of current through said first rectified current path such that the waveform of the input current at said power input port approximates the waveform of the input voltage at said power input port; and
   a current combining means for coupling the first rectified current path and the second rectified current path to said power output port.

2. The power factor corrected rectifying circuit of claim 1 wherein said first rectifying means comprises a half-wave rectifier coupled between said power input port and said power output port.

3. The power factor corrected rectifying circuit of claim 1 wherein said second rectifying means comprises a half-wave rectifier coupled between said power input port and said power output port.

4. The power factor corrected rectifying circuit of claim 1 wherein said first rectifying means comprises a full-wave rectifier coupled between said power input port and said power output port.

5. The power factor corrected rectifying circuit of claim 1 wherein said second rectifying means comprises a full-wave rectifier coupled between said power input port and said power output port.

6. The power factor corrected rectifying circuit of claim 1 wherein said current delay means comprises at least one inductor coupled between said first rectifying means and said power output port.

7. The power factor corrected rectifying circuit of claim 6 wherein said current combining means comprises a diode coupled between said current delay means and said power output port such that current cannot be conducted from said power output port to said current delay means and at least one capacitor coupled between said current delay means and a fixed reference potential.

8. The power factor corrected rectifying circuit of claim 7 wherein said fixed reference potential is ground.

9. The power factor corrected rectifying circuit of claim 7 wherein said first rectifying means and said second rectifying means are coupled to ground.

10. The power factor corrected rectifying circuit of claim 1 further comprising a transient energy reduction means for preventing transient voltage peaks from being coupled to said power output port.

11. A power factor corrected rectifying circuit comprising:
    a power input port for receiving an AC power source having an input voltage and an input current;
    a power output port;
    a first full-wave rectifier having an input coupled to said power input port and an output directly coupled to said power output port;
    a second full-wave rectifier having an input coupled to said power input port and an output, said first and second full-wave rectifiers being capable of simultaneously receiving current from said power input port;
    an inductor having an input coupled to said output of said second full-wave rectifier and an output, said inductor delaying the coupling of current such that the waveform of the input current approximates the waveform of the input voltage;
    a diode coupled between said output of said inductor and said power output port such that current cannot be conducted from said power output port to said inductor; and
    a capacitor coupled between said output of said inductor and a fixed reference potential.

12. The power factor corrected rectifying circuit of claim 11 wherein said first full-wave rectifier and said second full-wave rectifier collectively comprise six diodes configured as two overlapping full-wave rectifying bridge circuits.

13. A power factor corrected rectifying circuit comprising:
    a power input port for receiving an AC power source having an input voltage and an input current;
    a power output port;
    a first rectifying means for providing a first rectified current path between said power input port and said power output port;
    a second rectifying means for providing a second rectified current path between said power input port and said power output port, said rectified current paths being capable of simultaneously conducting current;
    a current delay means in said first rectified current path for delaying the coupling of current through said first rectified current path such that the waveform of the input current at said power input port approximates the waveform of the input voltage at said power input port;
    a current combining means for coupling the first rectified current path and the second rectified current path to said power output port; and
    a switching means having a first state wherein current is prevented from coupling through said current delay means and a second state wherein current is permitted to couple through said current delay means.

14. The power factor corrected rectifying circuit of claim 13 wherein said first rectifying means comprises a half-wave rectifier coupled between said power input port and said power output port.

15. The power factor corrected rectifying circuit of claim 13 wherein said second rectifying means comprises a half-wave rectifier coupled between said power input port and said power output port.

16. The power factor corrected rectifying circuit of claim 13 wherein said first rectifying means comprises a full-wave rectifier coupled between said power input port and said power output port.

17. The power factor corrected rectifying circuit of claim 13 wherein said second rectifying means comprises a full-wave rectifier coupled between said power input port and said power output port.

18. The power factor corrected rectifying circuit of claim 13 wherein said current delay means comprises at least one inductor.

* * * * *